Patented Jan. 14, 1936

2,027,838

UNITED STATES PATENT OFFICE 2,027,838

STABILIZING HYDROGEN PEROXIDE SOLUTIONS WITH PYROPHOSPHORIC ACID

Joseph S. Reichert, Niagara Falls, N. Y., assignor to E. I. du Pont de Nemours & Company, Inc., Wilmington, Del., a corporation of Delaware No Drawing. Application September 12, 1932, Serial No. 632,796

8 Claims. (Cl. 23—251)

This invention relates to the stabilization of hydrogen peroxide solutions and more specifically to the stabilization of the high concentration acid hydrogen peroxide solution as commonly transported.

In general it should be stated that hydrogen peroxide solutions are of two kinds, the first those which are transported and which are usually of relatively high concentrations, e. g. 10-volume or stronger, and which have been acidified in order to have maximum stability, and secondly, the more dilute, alkaline hydrogen peroxide solutions, as are commonly used for bleaching purposes.

For bleaching purposes it has been found more satisfactory to operate with solutions which are of an alkaline nature, since the alkalies assist in removing various impurities. Such alkaline solutions, however, are more unstable than the acid solutions and hence, it has been the common practice to add various stabilizers to the alkaline solution to prevent undue loss of peroxide.

Acidified hydrogen peroxide solutions, however, are more stable than the alkaline solutions and it is therefore preferred that for transportation and storage purposes the solutions be of an acid character. However, merely acidifying the peroxide with a mineral acid does not impart sufficient stability for transportation and storage purposes. Certain additional stabilizers have been proposed for such acid, relatively high-concentration, peroxide solutions but they have been of an unsatisfactory nature for several reasons. Many organic stabilizers are very effective in retarding the decomposition of impure hydrogen peroxide and their use adds very little to the peroxide production costs. However, organic stabilizers have undesirable properties. Materials such as salicylic acid or acetanilide form colored solutions if there are traces of iron salts in the bleach bath in which the peroxide is subsequently used, or the peroxide solution itself may become colored, due to the oxidation of these organic stabilizers. Furthermore, organic stabilizers are decomposed if the concentrated peroxide solutions are heated or allowed to stand for long periods and thereby lose their stabilizing properties.

Inorganic stabilizers are, in general, not as effective as organic stabilizers. The solubility of many inorganic compounds in strong acid peroxide solutions is small so that either cloudy solutions are obtained, or it is impossible to introduce enough stabilizer. Many inorganic materials as for example, ferric chloride, cause acid peroxide solutions to decompose rapidly.

The object of this invention is to provide a stabilizer for acidified hydrogen peroxide solutions and more particularly for a hydrogen peroxide solution of a concentration as ordinarily shipped in commerce, i. e. about 10-volume or higher, and to provide a high concentration peroxide solution which can be shipped and stored for relatively long periods without serious losses.

I have discovered that pyrophosphoric acid is an excellent stabilizer for hydrogen peroxide solutions of the nature described above. By stabilizing hydrogen peroxide solutions with pyrophosphoric acid, the combined stabilizing effect of the hydrogen ion and the pyrophosphate ion is obtained. Hydrogen peroxide solutions stabilized with pyrophosphoric acid show only very small losses when stored for long periods of time even at temperatures higher than the normal storage temperature.

In carrying out the present invention, a small amount, for example, 0.025 to 1.5 grams or more of pyrophosphoric acid is dissolved per liter of hydrogen peroxide solution to be stabilized. If the peroxide solution is not at the optimum acidity for stabilization, the pH is adjusted to the proper value by acids or alkalies as required. The results thereby obtained are shown in the following examples:

Example I

To portions of freshly prepared commercial hydrogen peroxide solution of 100-volume strength, varying amounts of pyrophosphoric acid were added. The acidity of the peroxide was adjusted after adding the pyrophosphoric acid to a pH of about 2.

These portions were stored at a constant temperature of 32° C. for a period of three months, together with other portions containing no stabilizer. During this time, at intervals of 30 days, the solutions were analyzed to determine the loss in volume concentration. The results appear in the following table:

| Concentration of $H_4P_2O_7$ | Volume loss during storage at 32° C. | | |
|---|---|---|---|
| | 30 days | 60 days | 90 days |
| None | 10.4 | 32.8 | 53.7 |
| 0.7 gram per liter | .8 | 2.5 | 4.6 |
| 1.5 grams per liter | .8 | 2.5 | 3.6 |

These results indicate that pyrophosphoric acid added in small amounts has a marked stabilizing effect on acid hydrogen peroxide solutions, and also that additions of 0.7 gram per liter or more tend to produce low losses for periods of over 2 months at 32° C.

Example II

To portions of freshly prepared commercial hydrogen peroxide solution of 100-volume strength an equivalent to 0.4 gram per liter of pyrophosphoric acid as $Na_4P_2O_7.10H_2O$ was added. The pH was adjusted to 4.3 after the addition of the $Na_4P_2O_7.10H_2O$.

This portion and a portion of unstabilized hydrogen peroxide were stored at a temperature of 32° C. for 30 days. At the end of this storage period both samples were analyzed for the loss in volume concentration. The results appear in the following table:

| Concentration of $H_4P_2O_7$ | Volume loss during storage at 32° C. for 60 days |
|---|---|
| None | 75.7 |
| 0.04 gram per liter | .7 |

The results of this experiment show the effectiveness of small amounts of $H_4P_2O_7$ as a stabilizer for hydrogen peroxide solutions.

Example III

To samples of 50-volume impure grade hydrogen peroxide, sodium pyrophosphate equivalent to 0.5 gram per liter was added and the solution adjusted to a pH of 5 with $H_2SO_4$ or NaOH. Other samples of the same peroxide containing no stabilizer were adjusted to a pH of 5 and tested with the stabilized samples. All samples were maintained at a constant temperature of 32° C. and the rate of oxygen evolution was measured. From these measurements the losses in volume concentration equivalent to the loss over a period of 30 days were calculated. These results appear in the following table:

| Concentration of $Na_4P_2O_7.10H_2O$ | Equivalent 30 day, 32° C. volume concentration loss |
|---|---|
| None | 19.3 |
| 0.5 gram per liter (equivalent to 0.2 grams $H_4P_2O_7$) | 5.5 |

These results indicate that $H_4P_2O_7$ produced by adding $Na_4P_2O_7$ to an acid hydrogen peroxide solution, is an effective stabilizer in impure grades of peroxide solutions.

Example IV illustrates the influence of hydrogen ion concentration on the effectiveness of my stabilizer.

Example IV

A series of 100-volume hydrogen peroxide solutions having varying degrees of acidity were prepared and 0.66 gram per liter of pyrophosphoric acid was dissolved in a portion of each solution. These solutions were tested as in Example III with the following results:

| Hydrogen ion concentration (pH) | Equivalent 30 day volume unstabilized solutions | Concentration loss stabilized solutions |
|---|---|---|
| 1.7 | 0.8 | 0.2 |
| 2.0 | 0.8 | 0.4 |
| 3.0 | 3.5 | 0.4 |
| 4.0 | 16.0 | 0.65 |
| 4.5 | 34.0 | 0.75 |
| 5.0 | Not tested | 0.8 |
| 6.0 | Not tested | 2.5 |
| 7.0 | Not tested | 6.5 |

A convenient method of securing the pyrophosphoric acid is by heating 85% orthophosphoric acid to a loss in weight of about 20%.

The stabilizing action of pyrophosphoric acid may thus be secured by adding to the hydrogen peroxide solution a salt of the acid, for example, alkali metal pyrophosphate or alkali metal acid pyrophosphates, together with sufficient of a strong acid to acidify the solution, or, pyrophosphoric acid itself may be added to the acid solution.

I am aware that it has been previously proposed to stabilize bleach liquors over a pH range of 7–10 with an alkali pyrophosphate. Here, however, the beneficial effect of pyrophosphoric acid is not secured because care is taken to maintain the solution within the definitely alkaline pH range of 7–10. Thus, the stabilizer is not pyrophosphoric acid but is an alkaline salt of the acid.

There are four alkali pyrophosphates of varying acidity: $Na_4P_2O_7$, $Na_3HP_2O_7$, $Na_2H_2P_2O_7$, and $NaH_3P_2O_7$. Computations from ionization data indicate that the last three of this group have a pH (in water solutions) below 7, and that the pH of $Na_4P_2O_7$ is above 7. In the case of commercial hydrogen peroxide solutions containing ionic impurities, I do not know the exact state of ionization, but I have found that effectiveness of my pyrophosphoric acid stabilizer is due to pyrophosphate ions in the presence of hydrogen ions, and, further, that alkali metal ions which are undoubtedly present in, for example, hydrogen peroxide solutions of pH 5 have no stabilizing action on hydrogen peroxide solutions. Thus, the effectiveness of this stabilizer can only be secured in solutions which are acid, i. e. have a pH of less than 7.

I have found pyrophosphoric acid to be of special utility in stabilizing hydrogen peroxide solutions for storage purposes at ordinary temperatures. I find it of considerable utility when used in combination with other stabilizers which also have a specific effect in stabilizing hydrogen peroxide at relatively high temperatures.

The exact amount of pyrophosphoric acid needed to secure maximum stability will vary over a wide range dependent on several factors such as impurities in the peroxide and other dissolved matter. I have used as little as 0.025 gram per liter and up to 1.5 grams per liter, but do not wish to be limited in the amount to be added because of the variations found.

As shown in the foregoing, the effectiveness of pyrophosphoric acid as a stabilizer exists in acid solutions, and in general, the best results are secured with pyrophosphoric acid alone when the stability of the solution lies in the pH range of about 1.5–4.5. However, I have found pyrophosphoric acid alone effectively stabilizes hydrogen peroxide solutions over the pH range between 1 and substantial neutrality. Hence, in this specification, and in the appended claims, when the pH is defined as being between 1 and 7, it means up to but not including 7. While the most effective range for pyrophosphoric acid alone is between about 1.5 and 4.5, when pyrophosphoric acid is used in combination with other stabilizers, the most effective pH range may be altered. Thus, with solutions of tin compounds as disclosed and claimed in my co-pending application, S. N. 572,721, filed Nov. 2, 1931, Patent No. 1,958,204, May 8, 1934, the most effective pH range is between about 3.5 and 6. Furthermore, the most suitable pH of the peroxide solutions and the exact amount of pyrophosphoric acid to be used for any specified lot of peroxide solutions must be adjusted in accordance with other variables such as impurities present in peroxide solutions, the nature of storage or shipping containers, and the storage conditions.

What is claimed is,

1. A method of stabilizing a hydrogen peroxide solution which comprises adding thereto a stabilizer which consists of a small amount of a pyrophosphate, and then adjusting the acidity of said solution to a pH of between 1 and 7.

2. A method of stabilizing a solution of hydrogen peroxide which comprises adding thereto a stabilizer which consists of a small amount of pyrophosphoric acid, and then adjusting the acidity of said solution to a pH value of between 1 and 7.

3. A method of preparing a stable, low residue, 100 volume solution of hydrogen peroxide which comprises adding to the hydrogen peroxide solution a stabilizer which consists of pyrophosphoric acid in amounts ranging from 0.025 gram to 1.5 grams per liter of solution, and then adjusting the acidity of said solution to a pH value of between 1 and 7.

4. A method of preparing a stable, low residue, 100 volume solution of hydrogen peroxide which comprises the steps of adding to the hydrogen peroxide solution a stabilizer which consists of pyrophosphoric acid in an amount ranging from 0.025 gram to 1.5 grams per liter of solution, and then adjusting the acidity of said solution to a pH value of between 1 and 7.

5. A process for preparing a stable solution of hydrogen peroxide which comprises the steps of adding to the hydrogen peroxide solution a stabilizer which consists of a pyrophosphate in an amount chemically equivalent to from 0.025 gram to 1.5 grams of pyrophosphoric acid per liter, and then adjusting the acidity of the solution to a pH value of between 1.5 and 4.5.

6. A homogeneous, stable solution of hydrogen peroxide of an acidity equivalent to a pH value of less than 6 which contains as a stabilizer a small amount of pyrophosphoric acid.

7. A homogeneous, stable solution of hydrogen peroxide of an acidity equivalent to a pH value of between 1 and 7 which contains, as a stabilizer, pyrophosphoric acid in an amount ranging from 0.025 gram to 1.5 grams per liter.

8. A homogeneous, stable solution of hydrogen peroxide of an acidity equivalent to a pH value of between 1.5 and 4.5 which contains as a stabilizer pyrophosphoric acid in an amount ranging from 0.25 gram to 1.5 grams per liter.

JOSEPH S. REICHERT.

Certificate of Correction

Patent No. 2,027,838.

January 14, 1936.

JOSEPH S. REICHERT

It is hereby certified that error appears in the printed specification of the above numbered patent requiring correction as follows: Page 2, first column, lines 59 to 63, inclusive, under Example IV, strike out the heading to the table and insert instead the following:

| Hydrogen Ion Concentration (pH) | Equivalent 30 Day Volume Concentration Loss | |
|---|---|---|
| | Unstabilized Solutions | Stabilized Solutions | and that the said Letters Patent should be read with this correction therein that the same may conform to the record of the case in the Patent Office.

Signed and sealed this 25th day of February, A. D. 1936.

[SEAL]

LESLIE FRAZER,
*Acting Commissioner of Patents.*

Certificate of Correction

Patent No. 2,027,838.

January 14, 1936.

JOSEPH S. REICHERT

It is hereby certified that error appears in the printed specification of the above numbered patent requiring correction as follows: Page 2, first column, lines 59 to 63, inclusive, under Example IV, strike out the heading to the table and insert instead the following:

| Hydrogen Ion Concentration (pH) | Equivalent 30 Day Volume Concentration Loss | |
|---|---|---|
| | Unstabilized Solutions | Stabilized Solutions | and that the said Letters Patent should be read with this correction therein that the same may conform to the record of the case in the Patent Office.

Signed and sealed this 25th day of February, A. D. 1936.

[SEAL]

LESLIE FRAZER,
*Acting Commissioner of Patents.*